United States Patent
Marappan et al.

(10) Patent No.: US 9,615,669 B2
(45) Date of Patent: Apr. 11, 2017

(54) ADJUSTABLE INTERFACE PRESSURE DEVICE

(71) Applicant: Goodrich Aerospace Services Private Limited, Bangalore (IN)

(72) Inventors: Bharath Marappan, Bangalore (IN); Skandan Berikai Kuppan, Bangalore (IN)

(73) Assignee: AMI INDUSTRIES, INC., Colorado Springs, CO (US)

(*) Notice: Subject to any disclaimer, the term of this patent is extended or adjusted under 35 U.S.C. 154(b) by 0 days.

(21) Appl. No.: 14/885,026

(22) Filed: Oct. 16, 2015

(65) Prior Publication Data

US 2017/0049244 A1 Feb. 23, 2017

(30) Foreign Application Priority Data

Aug. 20, 2015 (IN) .......................... 4365/CHE/2015

(51) Int. Cl.
| | | |
|---|---|---|
| *A47C 7/14* | (2006.01) | |
| *A47C 27/10* | (2006.01) | |
| *A47C 7/18* | (2006.01) | |
| *A47C 7/35* | (2006.01) | |
| *A47C 27/08* | (2006.01) | |

(52) U.S. Cl.
CPC .............. *A47C 27/10* (2013.01); *A47C 7/18* (2013.01); *A47C 7/35* (2013.01); *A47C 27/083* (2013.01)

(58) Field of Classification Search
CPC ........... A47C 7/18; A47C 7/35; A47C 27/083; A47C 27/10

USPC ................. 297/452.41, 452.64; 5/564, 655.3
See application file for complete search history.

(56) References Cited

U.S. PATENT DOCUMENTS

| | | | | | |
|---|---|---|---|---|---|
| 2,691,179 | A | * | 10/1954 | Kann | A47C 27/128 297/DIG. 3 |
| 3,680,918 | A | * | 8/1972 | Briggs | A47C 1/16 297/452.41 |
| 4,255,824 | A | * | 3/1981 | Pertchik | A47G 9/10 297/452.41 |
| 4,803,744 | A | * | 2/1989 | Peck | A61B 5/1115 5/706 |
| 5,044,030 | A | * | 9/1991 | Balaton | A47C 27/081 5/655.3 X |
| 5,303,977 | A | * | 4/1994 | Sereboff | A47C 4/54 297/452.41 X |
| 5,311,623 | A | * | 5/1994 | Hendi | A47C 27/081 5/685 |
| 5,396,671 | A | * | 3/1995 | Stacy | A61G 7/05776 5/655.3 X |
| 5,509,155 | A | * | 4/1996 | Zigarac | A61G 5/1043 5/655.3 X |

(Continued)

*Primary Examiner* — Rodney B White
(74) *Attorney, Agent, or Firm* — Cantor Colburn, LLP

(57) ABSTRACT

A method and system to provide an occupant support device includes a first inflatable tube, a second inflatable tube disposed parallel to the first inflatable tube, a third inflatable tube disposed at a relative angle to the first inflatable tube, above the first inflatable tube and below the second inflatable tube, a fourth inflatable tube disposed parallel to the third inflatable tube, below the first inflatable tube and above the second inflatable tube, and an inflation device to selectively provide a low pressure and a high pressure to at least one of the first inflatable tube, the second inflatable tube, the third inflatable tube, and the fourth inflatable tube.

20 Claims, 2 Drawing Sheets

(56) References Cited

U.S. PATENT DOCUMENTS

| | | | | |
|---|---|---|---|---|
| 6,212,719 B1* | 4/2001 | Thomas | ............... | A47C 4/54 |
| | | | | 297/452.41 X |
| 6,467,106 B1* | 10/2002 | Heimbrock | ......... | A61G 7/1026 |
| | | | | 5/655.3 X |
| 6,502,263 B1* | 1/2003 | Rowley | ............... | A47C 7/021 |
| | | | | 297/452.41 X |
| 6,551,450 B1* | 4/2003 | Thomas | ............ | A61H 9/0078 |
| | | | | 297/452.41 X |
| 7,441,294 B2* | 10/2008 | Mossbeck | ............ | A47C 27/082 |
| | | | | 297/452.41 |
| 7,444,703 B2* | 11/2008 | Jansen | ............... | A47C 27/081 |
| | | | | 5/655.3 |
| 7,849,544 B2* | 12/2010 | Flocard | ............. | A61G 7/05769 |
| | | | | 5/710 |
| 8,147,000 B1 | 4/2012 | Drake | | |
| 8,678,511 B2 | 3/2014 | Grover | | |
| 9,049,943 B2* | 6/2015 | Caminade | ............ | A61G 7/05776 |
| 2005/0269858 A1* | 12/2005 | Leutert | ............... | A47C 4/54 |
| | | | | 297/452.41 |
| 2009/0230742 A1* | 9/2009 | Habegger | ............ | B60N 2/4415 |
| | | | | 297/452.41 X |
| 2010/0205746 A1 | 8/2010 | Kerekes et al. | | |

\* cited by examiner

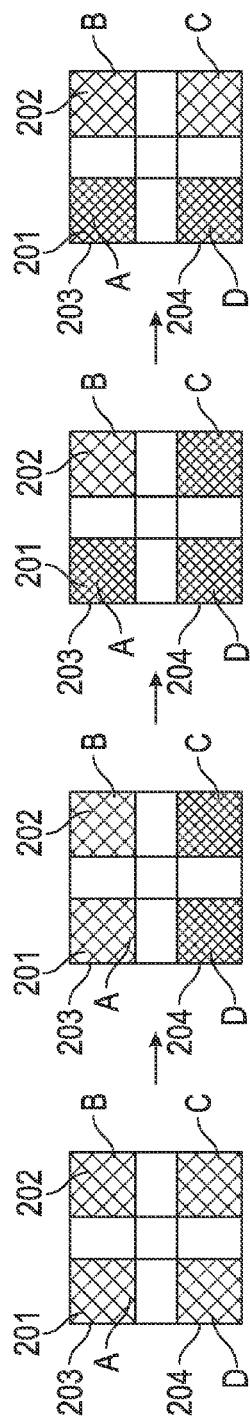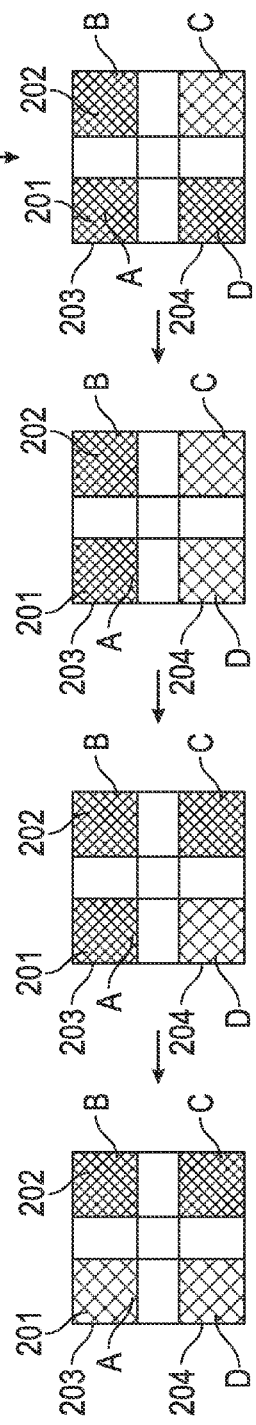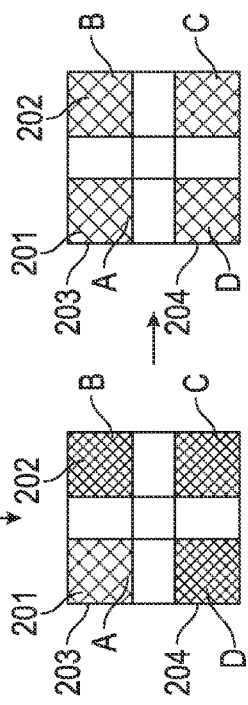

ADJUSTABLE INTERFACE PRESSURE DEVICE

CROSS REFERENCE TO RELATED APPLICATIONS

This application claims priority from Indian Provisional Patent Application No. 4365/CHE/2015, filed on Aug. 20, 2015, which is incorporated herein in its entirety by reference.

BACKGROUND

The subject matter disclosed herein relates to occupant support devices, and more particularly, to an apparatus and a method for providing varying interface pressure for an occupant.

Typically, conventional occupant support devices such as seat cushions and webbing are utilized to support occupants. In some cases, conventional occupant support devices create static interface pressure points that may result in poor circulation, compression of body tissues, arthritis, inflamed tendons and sheaths, joint deterioration, muscle pain, and swelling.

BRIEF SUMMARY

According to an embodiment, an occupant support device includes a first inflatable tube, a second inflatable tube disposed parallel to the first inflatable tube, a third inflatable tube disposed at a relative angle to the first inflatable tube, above the first inflatable tube and below the second inflatable tube, a fourth inflatable tube disposed parallel to the third inflatable tube, below the first inflatable tube and above the second inflatable tube, and an inflation device to selectively provide a low pressure and a high pressure to at least one of the first inflatable tube, the second inflatable tube, the third inflatable tube, and the fourth inflatable tube.

According to an embodiment, a method to vary an interface pressure for an occupant support device includes providing a first inflatable tube, providing a second inflatable tube disposed parallel to the first inflatable tube, providing a third inflatable tube disposed at a relative angle to the first inflatable tube, above the first inflatable tube and below the second inflatable tube, providing a fourth inflatable tube disposed parallel to the third inflatable tube, below the first inflatable tube and above the second inflatable tube, and selectively providing a low pressure and a high pressure to at least one of the first inflatable tube, the second inflatable tube, the third inflatable tube, and the fourth inflatable tube via an inflation device.

According to an embodiment, a seating device includes a first plurality of inflatable tubes, a second plurality of inflatable tubes disposed parallel to the first plurality of inflatable tubes, a third plurality of inflatable tubes disposed at a relative angle to the first plurality of inflatable tubes, above the first plurality of inflatable tubes and below the second plurality of inflatable tubes, a fourth plurality of inflatable tubes disposed parallel to the third plurality of inflatable tubes, below the first plurality of inflatable tubes and above the second plurality of inflatable tubes, and an inflation device to selectively provide a low pressure and a high pressure to at least one of the first plurality of inflatable tubes, the second plurality of inflatable tubes, the third plurality of inflatable tubes, and the fourth plurality of inflatable tubes.

Technical function of the embodiments described above includes an inflation device to selectively provide a low pressure and a high pressure to a group consisting of at least one of the first inflatable tube, the second inflatable tube, the third inflatable tube, and the fourth inflatable tube.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

FIGS. 2A-2J are schematic views of various pressure distribution configurations of the occupant support device shown in FIGS. 1A and 1B.

DETAILED DESCRIPTION

Figure 1A:
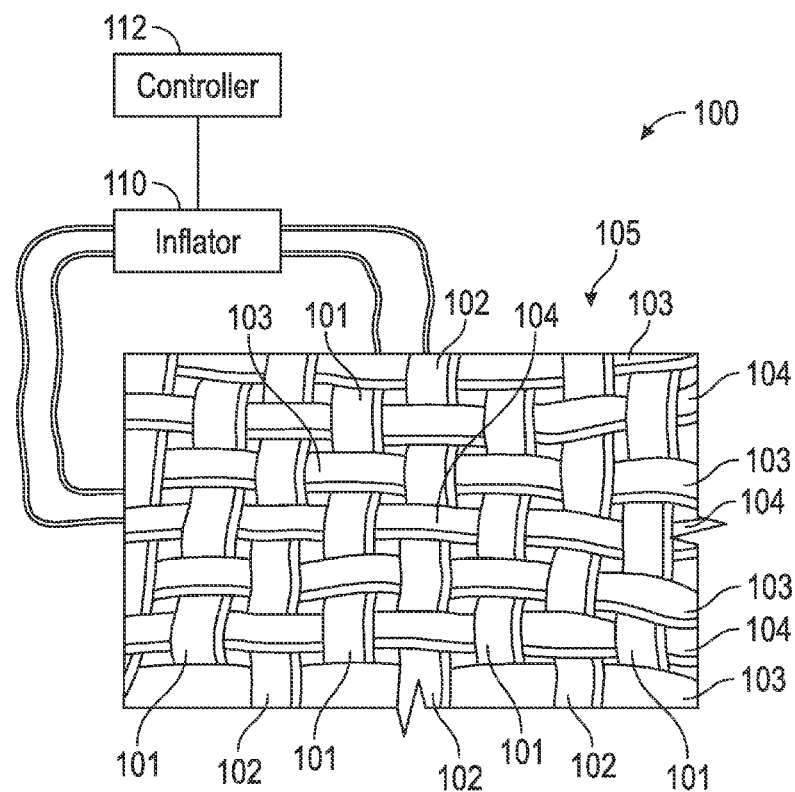
FIG. 1A illustrates a pictorial view of one embodiment of an occupant support device.

Referring to the figures, FIG. 1 shows an occupant support system 100. In the illustrated embodiment, the occupant support system 100 includes an interlaced tubing support 105, an inflator 110 and a controller 112. Advantageously, the occupant support system 100 can vary the location of interface pressure between the occupant and the occupant support system 100 to increase comfort and prevent harm to an occupant, particularly during limited mobility situations.

In the illustrated embodiment, the interlaced tubing support 105 includes a first inflatable tubing 101, a second inflatable tubing 102, a third inflatable tubing 103 and a fourth inflatable tubing 104. In the illustrated embodiment, the first inflatable tubing 101 and the second inflatable tubing 102 are parallel to each other and are weaved between the third inflatable tubing 103 and the fourth inflatable tubing 104, which are also parallel to one another. In certain embodiments, additional sets of parallel tubings could be provided.

The interlaced tubing support 105 can be selectively inflated and deflated to provide varying locations of interface pressure for an occupant. In one embodiment, by repositioning the interface pressure points of the interlaced tubing support 105 the pressure experienced by the occupant may be varied. The interlaced tubing support 105 can be utilized in aircrafts, wheel chairs, hospital beds, automobiles, massaging seats, etc.

In the illustrated embodiment, the first inflatable tube 101 is formed of a hollow tubular material. The first inflatable tube 101 can be formed of a resilient material to support the weight of an occupant when formed in the interlaced tubing support 105. The first inflatable tube 101 can be formed of elastomer, plastic, rubber, etc. The first inflatable tube 101 can include a hollow channel therein to allow for air or any other suitable fluid to flow there through to expand or increase in firmness. In the illustrated embodiment, the first inflatable tube 101 is part of a plurality of first inflatable tubes 101 as shown in FIG. 1.

In the illustrated embodiment, the second inflatable tube 102 is formed of a hollow tubular material. The second inflatable tube 102 can be formed of a resilient material to support the weight of an occupant when formed in the interlaced tubing support 105. The second inflatable tube 102 can be formed of elastomer, plastic, rubber, etc. The second inflatable tube 102 can include a hollow channel therein to allow for air or any other suitable fluid to flow there through to expand or increase in firmness. The second inflatable tube can be disposed in a direction generally parallel to the first inflatable tube 101. In the illustrated embodiment, the second inflatable tube 102 is part of a plurality of second inflatable tubes 102 as shown in FIG. 1.

In the illustrated embodiment, the third inflatable tube 103 is formed of a hollow tubular material. The third inflatable tube 103 can be formed of a resilient material to support the weight of an occupant when formed in the interlaced tubing support 105. The third inflatable tube 103 can be formed of elastomer, plastic, rubber, etc. The third inflatable tube 103 can include a hollow channel therein to allow for air or any other suitable fluid to flow there through to expand or increase in firmness. The third inflatable tube can be disposed generally at an angle relative to the first inflatable tube 101. In the illustrated embodiment, the relative angle is approximately 90 degrees or otherwise perpendicular to the first inflatable tube 101 and, by extension, the second inflatable tube 102. In the illustrated embodiment, the third inflatable tube 103 is part of a plurality of third inflatable tubes 103 as shown in FIG. 1.

In the illustrated embodiment, the fourth inflatable tube 104 is formed of a hollow tubular material. The fourth inflatable tube 104 can be formed of a resilient material to support the weight of an occupant when formed in the interlaced tubing support 105. The fourth inflatable tube 104 can be formed of elastomer, plastic, rubber, etc. The fourth inflatable tube 104 can include a hollow channel therein to allow for air or any other suitable fluid to flow there through to expand or increase in firmness. The fourth inflatable tube can be disposed generally parallel to the third inflatable tube 103. In the illustrated embodiment, the fourth inflatable tube 104 is part of a plurality of fourth inflatable tubes 104 as shown in FIG. 1.

As shown in FIG. 1A, the inflatable tubes 101, 102, 103, and 104 are interlaced or woven together to form an interlaced tubing support 105. In the illustrated embodiment, the first inflatable tube 101 is adjacent to the second inflatable tube 102. Further, the third inflatable tube 103 is adjacent to the fourth inflatable tube 104. In the illustrated embodiment, the inflatable tubes 101-104 can be disposed in a repeating pattern. In the illustrated embodiment, the first inflatable tube 101 is woven such that the first inflatable tube 101 goes below the third inflatable tube 103 and above the fourth inflatable tube 104. Similarly, the second inflatable tube 102 is woven such that the second inflatable tube 102 is disposed above the third inflatable tube 103 and below the fourth inflatable tube 104. The inflatable tubes 101-104 form a lattice that can support an occupant. In certain embodiments, the interlaced tubing support 105 can provide adequate occupant support in the absence of air or fluid pressure there through.

In the illustrated embodiment, due to the interlaced structure of the interlaced tubing support 105, interface pressure peaks between the interlaced tubing support 105 and the occupant can be localized and dynamically shifted by selectively inflating inflatable tubes 101-104 in a desired order. Advantageously, interface pressure locations experienced by an occupant can be continuously or periodically changed at intervals.

Figure 1B:
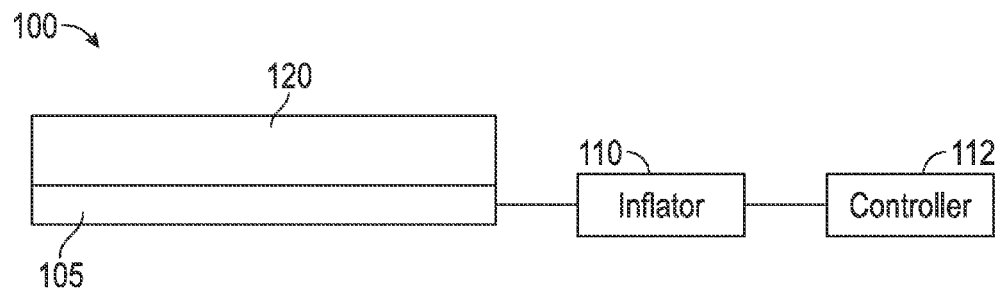
FIG. 1B illustrates a schematic view of one embodiment of an occupant support device.

Referring to FIG. 1B, in an illustrated embodiment, a foam cushion 120 can be disposed above the interlaced tubing support 105 for increased occupant comfort. The foam cushion 120 can allow for occupant comfort in addition to the dynamic interface pressure locations provided by interlaced tubing support 105.

Referring to FIGS. 1A and 1B, an inflator 110 and a controller 112 are shown. In the illustrated embodiment, the inflator 110 is in fluid communication with the inflatable tubes 101, 102, 103, and 104 of the interlaced tubing support 105. In the illustrated embodiment, the inflator 110 can provide a low pressure and a high pressure to the inflatable tubes 101, 102, 103, and 104 of the interlaced tubing support 105. In certain embodiments, the high pressure and the low pressure can be any suitable pressures contingent on occupant parameters, inflatable tube 101-104 characteristics, etc. In certain embodiments, the inflator 110 can utilize compressor bleed air, a dedicated compressor, air pump etc.

In the illustrated embodiment, the controller 112 can receive interface pressure measurements, flight information, occupant parameters, etc. to command the inflator 110 to selectively provide high and low pressures to the inflatable tubes 101, 102, 103, and 104 of the interlaced tubing support 105. Advantageously, the controlled application of a high and low pressure to inflatable tubes 101-104 can provide occupant comfort, while minimizing compression of occupant muscle tissues, prevent edema, etc.

Referring to FIGS. 2A-2J an illustrated embodiment of the inflation sequence of the inflatable tubes 201-204 is shown. The FIGS. 2A-2J depict a schematic representation of the inflatable tubes 201-204 disposed as shown in FIG. 1A. In the FIGS. 2A-2J, quadrant A depicts the overlapping of the inflatable tube 201 and the inflatable tube 203, quadrant B depicts the overlapping of the inflatable tube 202 and the inflatable tube 203, quadrant C depicts the overlapping of the inflatable tube 202 and the inflatable tube 204, and quadrant D depicts the overlapping of the inflatable tube 201 and the inflatable tube 204.

In the illustrated embodiment, quadrants A-D or a combination thereof can provide areas of peak interface pressure, which are depicted by cross-hatching. In the illustrated embodiment, the inflation of the inflatable tubes 201-204 or a combination thereof can provide various locations of peak interface pressure as shown in FIGS. 2A-2J. In certain embodiments, the inflator 110 and the controller 112 can provide various locations of peak interface pressure and various sequences of shifting the peak interface pressure location. While an illustrated sequence of peak interface pressure locations is shown, the inflatable tubes 201-204 can be utilized with any suitable configuration and sequence of peak interface pressure locations.

In FIG. 2A the inflatable tubes 201, 202, 203, and 204 are at the low pressure provided by the inflator. In the illustrated embodiment, all quadrants A-D receive the peak interface pressure due to equal distribution of pressure within the inflatable tubes 201-204.

In FIG. 2B the inflatable tube 203 is pressurized to the high pressure and inflatable tubes 201, 202, and 204 are pressurized to the low pressure. In the illustrated embodiment, quadrants A and B receive the peak interface pressure due to a greater pressure within inflatable tube 203.

In FIG. 2C, the inflatable tubes 202 and 203 are pressurized at the high pressure and inflatable tubes 201 and 204 are pressurized to the low pressure. In the illustrated embodiment, quadrant B receives the peak interface pressure due to a greater pressure within inflatable tubes 202 and 203, which overlap in quadrant B to form a higher pressure area.

In FIG. 2D, the inflatable tube 202 is pressurized to the high pressure and inflatable tubes 201, 203, and 204 are pressurized to the low pressure. In the illustrated embodiment, quadrants B and C receive the peak interface pressure due to a greater pressure within inflatable tube 202.

In FIG. 2E, inflatable tubes 202 and 204 are pressurized to the high pressure and inflatable tubes 201 and 203 are pressurized to the low pressure. In the illustrated embodiment, quadrant C receives the peak interface pressure due to a greater pressure within inflatable tubes 202 and 204, which overlap in quadrant C to form a higher pressure area.

In FIG. 2F, the inflatable tube 204 is pressurized to the high pressure and inflatable tubes 201, 202, and 203 are pressurized to the low pressure. In the illustrated embodiment, quadrants C and D receive the peak interface pressure due to a greater pressure within inflatable tube 204.

In FIG. 2G, the inflatable tubes 201 and 204 are pressurized to the high pressure and inflatable tubes 202 and 203 are pressurized to the low pressure. In the illustrated embodiment, quadrant D receives the peak interface pressure due to a greater pressure within inflatable tubes 201 and 204, which overlap in quadrant D to form a higher pressure area.

In FIG. 2H, the inflatable tube 201 is pressurized to the high pressure and inflatable tubes 202, 203, and 204 are pressurized to the low pressure. In the illustrated embodiment, quadrants A and D receive the peak interface pressure due to a greater pressure within inflatable tube 201.

In FIG. 2I, the inflatable tubes 201 and 203 are pressurized to the high pressure and inflatable tubes 202 and 204 are pressurized to the low pressure. In the illustrated embodiment, quadrant A receives the peak interface pressure due to a greater pressure within inflatable tubes 201 and 203, which overlap in quadrant A to form a higher pressure area.

In FIG. 2J all the inflatable tubes 201, 202, 203, and 204 are pressurized to the high pressure. In the illustrated embodiment, all quadrants A-D receive the peak interface pressure due to equal distribution of pressure within the inflatable tubes 201-204.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An occupant support device, comprising:
a first inflatable tube;
a second inflatable tube disposed parallel to the first inflatable tube;
a third inflatable tube disposed at a relative angle to the first inflatable tube, above the first inflatable tube and below the second inflatable tube;
a fourth inflatable tube disposed parallel to the third inflatable tube, below the first inflatable tube and above the second inflatable tube; and
an inflation device to selectively provide a low pressure and a high pressure to at least one of the first inflatable tube, the second inflatable tube, the third inflatable tube, and the fourth inflatable tube.

2. The occupant support device of claim 1, wherein the third inflatable tube is disposed perpendicular to the first inflatable tube.

3. The occupant support device of claim 1, further comprising a foam cushion supported by the first inflatable tube, the second inflatable tube, the third inflatable tube, and the fourth inflatable tube.

4. The occupant support device of claim 1, wherein the inflation device continuously selectively provides the low pressure and the high pressure to the group consisting of at least one of the first inflatable tube, the second inflatable tube, the third inflatable tube, and the fourth inflatable tube.

5. The occupant support device of claim 1, wherein the inflation device selectively provides the low pressure and the high pressure at a predetermined interval to the group consisting of at least one of the first inflatable tube, the second inflatable tube, the third inflatable tube, and the fourth inflatable tube.

6. A method to vary an interface pressure for an occupant support device, comprising:
providing a first inflatable tube;
providing a second inflatable tube disposed parallel to the first inflatable tube;
providing a third inflatable tube disposed at a relative angle to the first inflatable tube, above the first inflatable tube and below the second inflatable tube;
providing a fourth inflatable tube disposed parallel to the third inflatable tube, below the first inflatable tube and above the second inflatable tube; and
selectively providing a low pressure and a high pressure to at least one of the first inflatable tube, the second inflatable tube, the third inflatable tube, and the fourth inflatable tube via an inflation device.

7. The method of claim 6, further comprising providing the low pressure to the first inflatable tube, the second inflatable tube, the third inflatable tube, and the fourth inflatable tube via the inflation device.

8. The method of claim 6, further comprising providing the low pressure to the first inflatable tube, the second inflatable tube and the fourth inflatable tube via the inflation device and providing the high pressure to the third inflatable tube via the inflation device.

9. The method of claim 6, further comprising providing the low pressure to the first inflatable tube and the fourth inflatable tube via the inflation device and providing the high pressure to the third inflatable tube and the second inflatable tube via the inflation device.

10. The method of claim 6, further comprising providing the low pressure to the first inflatable tube, the third inflatable tube, the fourth inflatable tube via the inflation device and providing the high pressure to the second inflatable tube via the inflation device.

11. The method of claim 6, further comprising providing the low pressure to the first inflatable tube and the third inflatable tube via the inflation device and providing the high pressure to the second inflatable tube and the fourth inflatable tube via the inflation device.

12. The method of claim 6, further comprising providing the low pressure to the first inflatable tube, the second inflatable tube and the third inflatable tube via the inflation device and providing the high pressure to the fourth inflatable tube via the inflation device.

13. The method of claim 6, further comprising providing the low pressure to the second inflatable tube and the third inflatable tube via the inflation device and providing the high pressure to the first inflatable tube and the fourth inflatable tube via the inflation device.

14. The method of claim 6, further comprising providing the low pressure to the second inflatable tube, the third inflatable tube and the fourth inflatable tube via the inflation device and providing the high pressure to the first inflatable tube via the inflation device.

15. The method of claim 6, further comprising providing the low pressure to the second inflatable tube and the fourth inflatable tube via the inflation device and providing the high pressure to the first inflatable tube and the third inflatable tube via the inflation device.

16. The method of claim 6, further comprising providing the low pressure to the second inflatable tube via the inflation device and providing the high pressure to the first inflatable tube, the third inflatable tube and the fourth inflatable tube via the inflation device.

17. The method of claim 6, further comprising providing the high pressure to the first inflatable tube, the second inflatable tube the third inflatable tube and the fourth inflatable tube via the inflation device.

18. A seating device, comprising:
a first plurality of inflatable tubes;
a second plurality of inflatable tubes disposed parallel to the first plurality of inflatable tubes;
a third plurality of inflatable tubes disposed at a relative angle to the first plurality of inflatable tubes, above the first plurality of inflatable tubes and below the second plurality of inflatable tubes;
a fourth plurality of inflatable tubes disposed parallel to the third plurality of inflatable tubes, below the first plurality of inflatable tubes and above the second plurality of inflatable tubes; and
an inflation device to selectively provide a low pressure and a high pressure to at least one of the first plurality of inflatable tubes, the second plurality of inflatable tubes, the third plurality of inflatable tubes, and the fourth plurality of inflatable tubes.

19. The seating device of claim 18, further comprising a foam cushion supported by the first plurality of inflatable tubes, the second plurality of inflatable tubes, the third plurality of inflatable tubes, and the fourth plurality of inflatable tubes.

20. The occupant support device of claim 18, wherein the inflation device continuously selectively provides the low pressure and the high pressure to the group consisting of at least one of the first plurality of inflatable tubes, the second plurality of inflatable tubes, the third plurality of inflatable tubes, and the fourth plurality of inflatable tubes.

* * * * *